Patented Aug. 27, 1946

2,406,582

UNITED STATES PATENT OFFICE 2,406,582

REMOVAL OF SULPHUR FROM MOLTEN METALLIC MASSES

Clarence George Bieber, Bengt Edward Ernst Franke, and Walter Franklin Sumpter, Huntington, W. Va., assignors to The International Nickel Company, Inc., New York, N. Y., a corporation of Delaware No Drawing. Application April 14, 1943, Serial No. 483,046

28 Claims. (Cl. 75—82)

The present invention relates to a method of removing sulphur from molten metal-containing masses, and particularly to a method of removing sulphur from molten baths in which nickel is the predominant metal.

The use of a white "carbide" slag, i. e., a slag of lime and fluorspar containing a small amount of carbon to form calcium carbide, to remove sulphur from molten masses of nickel and nickel alloys has been well-known for many years but this method of removing sulphur had certain disadvantages when used in commercial practice on an industrial scale. The method was slow and ineffective in removing sulphur. Prior practice based upon experience gained in refining many hundreds of millions of pounds of nickel and nickel alloys, for example the nickel-copper alloy of the type sold under the trade-mark "Monel" which contains approximately two parts nickel and one part copper, had established that one "carbide" slag had to be used for each 0.02% of sulphur that had to be removed from the melt. Two slags were used on every melt that melted down with less than 0.04% sulphur. Three slags were used on heats that melted down with 0.04% to 0.06% sulphur. Four slags were used on heats that melted down with 0.06% to 0.08% sulphur. As the sulphur content increased the number of slags required increased in the same proportion. On a standard 33,000 pound melt of a nickel-copper alloy of the type sold under the trademark of "Monel," each slag contained about 300 pounds of lime, 300 pounds of fluorspar and about 15 pounds of carbon. Not only did this method suffer from the disadvantage that a very small amount of sulphur was removed with each slag and that many operations were required to remove substantial amounts of sulphur, but, in addition, this method suffered from the disadvantage that it was lengthy and time-consuming. Each slag was allowed to remain on the melt about 45 minutes after it, i. e., the slag, had been thoroughly fused. The over-all time for introducing each slag, holding it, and then removing it, was about one hour to one hour and fifteen minutes. The proper "working" of a carbide slag required the exercise of considerable skill and judgment and even under the best conditions it did not always produce consistent and satisfactory results. In some cases the sulphur content of the metal would be as high after the carbide slag had been removed as it was before the slag was put on. Although many attempts were made to remedy the aforesaid shortcomings, none, as far as we are aware, was entirely successful when put into commercial operation on an industrial scale in consistently and rapidly producing satisfactory results.

We have discovered that the aforesaid shortcomings may be solved in a remarkably effective manner and that sulphur may be removed rapidly and efficiently from molten metal-containing masses, particularly molten nickel-containing masses.

It is an object of the present invention to provide a novel method for rapidly removing sulphur from molten metal-containing masses.

It is another object of the present invention to provide an improved method for removing sulphur from molten nickel-containing masses which is remarkably rapid and efficient.

It is a further object of the present invention to provide an improved method of removing sulphur from molten nickel-containing masses which does not require the use of a large number of slags to remove substantial amounts of sulphur.

The invention further provides a method of removing larger amounts of sulphur from molten nickel and nickel-base alloys than has been practicable heretofore in commercial operation.

Other objects and advantages of the present invention will become apparent to those skilled in the art from the following description.

Generally speaking, the present invention provides a novel process for removing sulphur from molten metal-containing masses, particularly molten nickel-containing masses, which comprises covering the molten sulphur-containing mass with a white fluoride slag, introducing at least one soluble calcium-containing and/or magnesium-containing metallic treating agent into the body of said molten mass, holding said molten mass under said slag for sufficient time for the slag to take up sulphur, probably as a sulphide, thereafter removing all the slag from the surface of the bath, subjecting said molten mass to treatment, preferably oxidation treatment, to remove or decrease any excess amounts of said treating agent and/or of carbon and the like, and casting the molten mass. The minimum amount of treating agent which may be used depends upon the amount of sulphur to be removed. Preferably, a minimum of about five pounds of calcium and/or magnesium should be added for each four pounds of sulphur that are to be removed. This represents an addition of about 0.05% of calcium or magnesium, or both, to remove about 0.04% sulphur and is an approximation of the minimum amounts of treating agent which in practice have been found to satisfactorily remove a given amount of sulphur. In carrying the invention into practice on a commercial scale, many practical considerations have to be taken into account. For example, part of the calcium generally rises to the surface and burns and is, therefore, not effective in reducing sulphur. Also, some incidental sulphur removal may occur so that in some cases a larger amount of sulphur may be removed than would be expected from the amount of calcium and/or magnesium added. While it has been found that an addition of as little as four parts by weight or even less of calcium for every five parts by weight of sulphur to be removed eliminates the sulphur, in commercial practice it is preferred to add a minimum of five parts by weight of calcium for every four parts by weight of sulphur to be removed in order to consistently obtain the desired sulphur elimination. The former proportions will produce complete sulphur elimination but in actual practice it was found that in some cases the sulphur was completely eliminated and not in others. When magnesium is used instead of calcium, we have found that somewhat smaller amounts of magnesium have the same effect as calcium, e. g., it is preferred to add a minimum of an equal part by weight of magnesium for each part of sulphur to be removed in order to consistently obtain the desired sulphur elimination. As will be apparent to those skilled in the art, larger amounts of the treating agent than the minimum set forth herein may be introduced into the molten bath and the excess removed in a subsequent operation, e. g., an oxidation treatment. When the amounts of treating agent are referred to in terms of parts, it is to be understood that parts by weight are meant.

It is important that the metallic treating agent be added in such a manner that the proper amount actually dissolves in or alloys with the bath and does not rise to the surface of the bath to burn or oxidize. The treating agent, e. g., lumps of elemental calcium or calcium silicide about one to four inches in diameter, may be satisfactorily incorporated by fastening it to an iron holder which is then plunged down into the bath and held or stirred below the surface of the bath until the treating agent has been intimately mixed with all portions of the molten material. Any excess calcium and/or magnesium, and any excess silicon which may be introduced with the treating agent, are preferably eliminated during the subsequent operation of oxidizing the molten bath which also reduces the carbon content of the melt to the desired amount.

The present method differs from the conventional practice in that the large number of carbide slags that would normally be employed for sulphur removal are omitted and in their place a single white slag is substituted, or where large amounts of sulphur are to be removed, at most only a few white slags are used, and calcium and/or magnesium is added under the slag, preferably in elemental form and/or as an alloy with silicon. By combining a treatment with a calcium and/or magnesium metallic treating agent with the use of a white fluoride slag such as a fluorspar and lime slag, with or without carbon, it is now possible to remove large amounts of sulphur, such as about 0.1% or 0.2%, from a 33,000 pound melt with a single slag in about fifteen or twenty minutes after the addition of the treating agent. Instead of dealing with a slow, costly and undependable reaction as was the case with the carbide slag, the present invention provides a fast, economical, dependable method for the removal of sulphur. While all of the sulphur of a high sulphur melt, e. g., 0.7% sulphur, could possibly be removed by one slag if it were large enough, such practice is not commercially feasible and it is preferred to use a few slags in such cases.

It is an essential feature of the improved process that the metallic treating agent be used in combination with the slag covering. The use of either one alone has been found to be unsatisfactory in commercial practice. Thus, calcium additions of 0.04% to two nickel-containing melts without using a white slag covering resulted in lowering the sulphur content from 0.04% to 0.033% and 0.034%, respectively. The same calcium addition when used in conjunction with the white slag lowers the sulphur content to about 0.005% or less. The slag employed should be quite fluid and in addition should be either neutral or reducing, but not oxidizing. In carrying out the present invention a basic-lined furnace or other container should be used in preference to an acid-lined furnace or container.

An important feature of the present invention is that the molten bath be held for sufficient time after the treating agent is introduced to permit the fluoride slag to take up the sulphur. While the present invention provides a method of removing sulphur far more rapidly than has been possible heretofore in commercial operation, there is a critical minimum holding time required in the present process for removal of substantial amounts of sulphur. In general, the molten mass should be held under the slag for at least five or ten minutes after the treating agent is introduced to obtain removal of any substantial amounts of sulphur. Little or no sulphur elimination takes place when the slag is removed or the molten metal is tapped immediately after the addition of the calcium and/or magnesium treating agent. It is essential to hold the molten bath under the slag covering for sufficient time to allow the slag to take up the sulphur which rises to the surface when the treating agent has dissolved and reacted in the molten bath. In commercial practice a holding time of about fifteen to twenty minutes is necessary to assure commercially satisfactory results when amounts of sulphur of the order of about 0.1% to about 0.2% are to be removed. Similarly, it has been found that too long a holding time is undesirable. If the molten bath is held in the furnace for too long a time after the addition of the calcium and/or magnesium treating agent, the reaction tends to reverse and the sulphur is driven back into the molten metal. In commercial operation, holding times in excess of about 45 minutes to about one hour have been found to be undesirable. It is also very important in removing the slag that it be completely removed from the molten bath. If only partly removed the reaction will reverse and the sulphur will revert to the bath. After the slag is removed, any excesses of the treating agent, particularly calcium, must be substantially all removed from the bath, for example, by oxidation or by any other known method, since as little as about 0.02% of calcium will render unforgeable nickel and nickel alloys such as the nickel-copper alloys of the type sold under the trade-mark "Monel."

The treating agent used in the present invention should contain calcium or magnesium, or both, and should be in a form which is soluble in the molten mass to be treated. Elemental calcium or magnesium has given satisfactory results in the treatment of nickel-containing molten masses. Silicides of these elements may also be used and the alloy frequently referred to as calcium-silicon, silico-calcium or calcium silicide has been found to be highly satisfactory. It will be understood that by silicides of the aforesaid elements are meant alloys of calcium or magnesium with silicon. Thus, in one commercial form calcium is sold as an alloy of calcium and silicon containing about 23% to 35% calcium and 65% to 77% silicon with minor amounts of impurities such as iron, etc. Instead of silicides, i. e., alloys with silicon, master alloys or addition alloys of calcium and/or magnesium with one or more other metals may be used. It has been found that non-metallic carbides such as calcium carbide cannot be used as a treating agent for molten nickel and nickel-rich masses in place of calcium or calcium silicide. There is a difference in kind between the reaction of calcium carbide and that of calcium or calcium silicide. Calcium carbide has a negligible solubility in the molten metal and, apparently, can react only at the slag and metal interface. Calcium and calcium silicide on the other hand have been found to be highly soluble in molten metal and alloys, such as nickel and nickel-base alloys, and to react instantaneously throughout the bath. This difference in behavior is an essential distinction between the method provided by the present invention and the prior ineffective carbide slag method used heretofore in removing sulphur from nickel and nickel-rich molten masses.

In the treatment of nickel and nickel alloys it has been found advantageous to use calcium and calcium-containing metallic treating agents for removing sulphur from melts containing less than about 0.15% to 0.2% sulphur to lower the sulphur content to small amounts of the order of about 0.005%. Thus, molten masses of nickel-copper alloys containing about 67% nickel, 30% copper, and about 0.03% or 0.04% to 0.09% sulphur are very satisfactorily treated under a single white slag with about 0.04% or 0.05% to 0.1% of calcium introduced as elemental calcium or as calcium silicide. While a calcium agent is preferred in treating the bath to remove the final amounts of sulphur, magnesium may be used and the use of this element possesses the advantage that excess amounts are far less detrimental upon workability, e. g., forgeability, than are excesses of calcium so that it may be possible to omit or simplify subsequent treatment of the bath to remove excesses of the treating agent. For molten baths containing more than about 0.2% sulphur, for example, about 0.2% to 0.5%, or even more, it has been found advantageous to use magnesium and magnesium-containing treating agents to reduce this sulphur to below 0.2%, for example, to about 0.05%, and then to remove the remaining sulphur by means of calcium or a calcium-containing treating agent.

In carrying the present invention into practice the soluble treating agents containing calcium, magnesium or combinations thereof are preferably added under a basic white fluoride slag of lime, i. e., calcium oxide, and fluorspar, i. e., calcium fluoride. The white fluoride slag preferably contains about 40% to about 60% of fluorspar and about 60% to about 40% of lime, but the permissible range of fluorspar is from about 25% to about 100% and the permissible range of lime is up to about 75%. The slag may contain small amounts up to about 10% of silica as an impurity and may contain small amounts of other ingredients, for example, sodium fluoride, aluminum fluoride, and/or sodium carbonate. Carbon may also be present in the slag but this element is not essential. Sulphur removal has been obtained on small scale melts with the use of slags containing sodium fluoride, aluminum fluoride and mixtures thereof. Attempts to use cryolite instead of fluorspar in commercial practice have not been very satisfactory, not only because it does not appear to be as effective as fluorspar in contributing to the removal of sulphur but also because it has been found to be harmful to the furnace lining. The minimum amount of slag used is governed by practical considerations connected with the operation of the furnace rather than by the amount of sulphur to be removed. The solubility of the slag for sulphur, or the sulphides formed, apparently is very high. In one commercial size melt about 500 pounds of a white slag dissolved about 160 pounds of sulphur. About ten to about twenty minutes after the calcium and/or magnesium treating agent has been added the white slag is then removed carrying the sulphur with it. While shorter holding times of the order of about five minutes may be sufficient in some cases, it is preferred to hold the molten bath for at least ten minutes or more to assure elimination of the sulphur. In removing the slag care should be taken to remove it as completely as practicable. Unless the slag containing the sulphur is quite thoroughly removed, the sulphur and/or selenium content of the melt may increase when the melt is oxidized to remove any excess of the treating agent and/or silicon. When high sulphur melts are treated, it is desirable to add a second or "rinse" slag similar to the first slag to assist in removing the last traces of the sulphur-containing slag. The molten bath is then subjected to oxidation, for example, by adding a metal oxide, to remove any excess of calcium or other treating agent, and of silicon, and to reduce any carbon to a normal range, for example, to about 0.1% to 0.15%. Another white fluoride slag, for example, a basic slag of lime and fluorspar, is then placed on the surface of the molten bath and the bath is deoxidized in the usual manner. A particularly effective deoxidation practice which also has a malleabilizing effect on nickel and nickel alloys comprises adding aluminum and adding phosphorus, zirconium and magnesium, or modifications of this practice, as described in U. S. Patent No. 2,150,095. The final slag may be of the same composition as the one used to effect a removal of the sulphur and is used as a protective covering during the addition of the final deoxidizers and/or malleabilizing agents. This slag also serves to remove the last traces of sulphur in case the sulphur removal treatment has not completely eliminated as much sulphur as desired, or in case the molten bath has become resulphurized after the sulphur removal treatment. When pigs are to be produced the deoxidation treatment and final slag may be omitted but the use of a final slag is preferred to prevent the molten metal from oxidizing. Thereafter the molten metal may be tapped into a ladle and teemed into molds in the usual manner.

It has been found desirable to carry out the process of the present invention in a basic-lined furnace or receptacle and in the presence of appreciable amounts of manganese, for example, about 1%. Sulphur can be removed from molten metal baths which do not contain manganese but the reaction is much less effective in the absence of this element. Manganese in amounts of at least about 0.25% and up to about 10%, for example, about 1% to 2%, markedly improve the effectiveness of the present invention in eliminating sulphur from a molten bath of nickel or nickel-base alloy. For example, in treating a bath of molten nickel containing about 0.1% of sulphur or higher in accordance with the present invention, the sulphur content of manganese-containing molten nickel was reduced to about 0.005% or less in the same time that the same treatment reduced the sulphur content of manganese-free molten nickel to about 0.02% to 0.05%. However, in certain instances manganese is undesirable in the solid metal and in such cases the molten bath may not contain manganese when treated to remove sulphur in accordance with the present invention.

In order that those skilled in the art may have a better understanding of the present invention, the following examples are given:

EXAMPLE No. I

About 1000 pounds of high-sulphur pigs of a nickel-copper alloy of the type sold under the trade-mark of "Monel" and having a composition within the range of about 63 to 75% nickel and about 25 to 35% copper and containing about 0.07% sulphur were melted down in a basic-lined electric arc furnace. About 50 pounds of a white basic slag containing about 60% lime and about 40% fluorspar were put on the surface of the melt and about 1% manganese was introduced into the molten metal. About 0.1% of calcium, as calcium silicon, and about 0.1% metallic magnesium were introduced in the melt under the white slag.

In order to show the effectiveness of the process in removing sulphur, samples were taken at five-minute intervals. A half hour after the addition of the treating agents the white slag was removed and the carbon, calcium and silicon were oxidized by adding an oxide of nickel and copper. About 50 pounds of a finishing slag similar to the first slag was then placed on the surface of the molten metal and the melt was deoxidized and treated with about 0.1% aluminum, about 0.025% zirconium, about 0.015% phosphorus and about 0.05% magnesium. The melt was then tapped into the ladle and teemed into 10" x 10" molds. The sulphur content of the melt, which melted down with about 0.061% sulphur, was reduced to about 0.005% sulphur about twenty minutes after the addition of the treating agent. The sulphur, selenium, carbon and manganese contents of the bath as determined from the samples are set forth in Schedule I. As indicated in this schedule, and as observed in other melts, any selenium which is present is usually removed along with the sulphur.

Schedule I

| Time when sample taken | Percent sulphur | Percent selenium | Percent carbon | Percent manganese |
|---|---|---|---|---|
| Melt down | 0.061 | 0.008 | 0.32 | |
| 5 min. after addition | 0.019 | 0.003 | 0.32 | 1.11 |
| 10 min. after addition | 0.008 | 0.003 | 0.32 | 1.09 |
| 15 min. after addition | 0.009 | 0.003 | 0.32 | 1.14 |
| 20 min. after addition | 0.005 | 0.002 | 0.32 | 1.14 |
| 25 min. after addition | 0.005 | 0.001 | 0.32 | 1.13 |
| 30 min. after addition | 0.005 | 0.001 | 0.32 | 1.15 |

EXAMPLE No. II

Another 1000 pound melt of high-sulphur nickel-copper alloy pigs containing about 0.07% sulphur were treated in the same manner as in the previous example, except that about 0.1% of calcium, as calcium silicon, without magnesium was used as the treating agent. Samples were again taken at five-minute intervals and the slag removed about one-half hour after the addition of the calcium-treating agent. The melt was finished in the same manner as in the preceding example. The sulphur content of this melt which melted down with about 0.062% sulphur was rapidly reduced to about 0.005% sulphur in about five minutes, as set forth in Schedule II. While the sulphur was removed more rapidly than in the preceding example, other melts do not indicate that calcium alone is more effective than the combined use of calcium and magnesium in eliminating sulphur.

Schedule II

| Time when sample taken | Per cent sulphur | Per cent carbon | Per cent manganese | Per cent silicon |
|---|---|---|---|---|
| Melt down | 0.062 | 0.42 | | |
| 5 min. after addition | 0.005 | 0.41 | 1.11 | 0.18 |
| 10 min. after addition | 0.005 | 0.41 | 1.10 | 0.17 |
| 15 min after addition | 0.005 | 0.42 | 1.08 | 0.15 |
| 20 min after addition | 0.005 | 0.41 | 1.08 | 0.15 |
| 25 min after addition | 0.005 | 0.42 | 1.08 | 0.12 |
| After oxide added | 0.005 | 0.17 | 0.68 | 0.01 |
| After final treatment | 0.005 | 0.15 | 0.93 | 0.05 |

EXAMPLE No. III

A full sized commercial melt of a nickel-copper alloy of the same type as in the preceding examples and weighing about 33,000 pounds was prepared in an acid-lined open hearth furnace and the melt was then duplexed, i. e., transferred, into a basic-lined electric arc furnace. The melt came over from the open hearth with a low carbon content and following conventional practice the carbon content was raised to about 0.3% and about 1.35% of manganese was added. About 600 pounds of a white slag of about 60% lime and about 40% fluorspar was then placed on the surface of the bath and about 0.1% of calcium, as calcium silicon, was added to the bath. Samples were taken at ten-minute intervals after the addition of the calcium treating agent. About one hour after the introduction of the calcium treating agent the slag was removed and the carbon was eliminated by the addition of an oxide of nickel and copper. The excess calcium and silicon were also removed by this oxide treatment. About 50 pounds of a finishing white slag similar to the first slag was placed on the surface of the metal bath, the temperature was raised and the melt was pigged, i. e., cast into pigs. The charge melted down with about 0.017% sulphur and about 0.007% selenium. About ten minutes after the addition of the calcium treating agent the sulphur had been reduced to about 0.005% and the selenium to about 0.002%. Holding the calcium-containing melt after the sulphur had been removed for an additional period up to one hour did not have any deleterious effect upon the sulphur content of the melt and, in fact, reduced the selenium content down to traces less than 0.001% at the end of forty minutes. The contents of various minor constituents, including sulphur, at ten-minute intervals up to one hour, are set forth in Schedule III.

*Schedule III*

| Time when sample taken | Percent sulphur | Percent carbon | Percent manganese | Percent silicon |
|---|---|---|---|---|
| Melt down | 0.017 | 0.30 | 0.62 | |
| 10 min. after addition | 0.005 | 0.30 | 0.62 | 0.19 |
| 20 min. after addition | 0.005 | 0.30 | 0.61 | 0.19 |
| 30 min. after addition | 0.005 | 0.29 | 0.62 | 0.19 |
| 40 min. after addition | 0.005 | 0.30 | 0.63 | 0.19 |
| 50 min. after addition | 0.005 | 0.30 | 0.62 | 0.19 |
| 60 min. after addition | 0.005 | 0.30 | 0.63 | 0.20 |
| After finishing slag | 0.005 | 0.14 | 0.55 | 0.02 |

Example No. IV

Another full sized commercial melt of a nickel-copper alloy of the same type as in the preceding examples and weighing about 40,000 pounds was duplexed from an open hearth furnace into an electric arc furnace. The heat melted down with about 0.079% sulphur, about 0.15% carbon, about 30% copper and balance mainly nickel. About 900 pounds of ferro-manganese and about 200 pounds of petroleum coke were added to the bath in the electric furnace to raise the carbon content to 0.30% and the manganese content to 1.73%. About 300 pounds of lime, about 200 pounds of fluorspar and about 30 pounds of coke dust were then placed on the surface of the bath to form a white slag of lime and fluorspar. About 0.12% of calcium, as calcium-silicon, was then introduced into the molten bath. About 25 minutes later the slag was thoroughly removed and replaced by a rinse slag made of about 150 pounds of lime and about 100 pounds of fluorspar. The rinse slag was removed and the bath was then subjected to an oxidation treatment by adding about 1200 pounds of an oxide of nickel and copper. About 300 pounds of lime, 200 pounds of fluorspar and 30 pounds of coke were then placed on the surface of the bath to form a slag. At this stage the bath contained about 0.14% carbon, 1.14% manganese, and 0.007% sulphur. About 140 pounds of ferro-manganese were added and then the bath was treated with about 0.1% aluminum, 0.025% zirconium, 0.025% titanium, 0.015% phosphorus and 0.05% magnesium. The bath was then tapped and cast. The final analysis of the nickel-copper alloy is set forth in Schedule IV.

*Schedule IV*

| Per cent Ni | Per cent Cu | Per cent S | Per cent C | Per cent Si | Per cent Mn | Per cent Fe | Per cent P |
|---|---|---|---|---|---|---|---|
| 66.9 | 29.5 | 0.005 | 0.18 | 0.11 | 1.83 | 1.47 | 0.026 |

Example No. V

A 1000 pound charge of high-sulphur nickel pigs was melted in a basic-lined electric arc furnace. The charge melted down with about 0.074% sulphur and about 0.32% carbon. About 1% of manganese was then added and about 50 pounds of a white slag containing about 60% lime and 40% fluorspar was placed on the surface of the bath. About 0.1% of calcium, as calcium silicon, was then introduced into the molten bath. Samples were taken at five-minute intervals for a period of about 30 minutes, at which time the slag was removed. The melt was subjected to an oxidation treatment and cast into pigs. The sample taken from the melt about five minutes after the calcium addition showed that the sulphur had been eliminated down to about 0.005%. The amounts of minor constituents, including sulphur, contained in the molten nickel at various intervals after the addition of the calcium treating agent are set forth in Schedule V.

*Schedule V*

| Time when sample taken | Percent sulphur | Percent carbon | Percent manganese | Percent silicon |
|---|---|---|---|---|
| Melt down | 0.074 | 0.32 | | |
| 5 min. after addition | 0.005 | 0.36 | 0.88 | 0.18 |
| 10 min. after addition | 0.005 | 0.37 | 0.88 | 0.16 |
| 15 min. after addition | 0.005 | 0.36 | 0.87 | 0.15 |
| 20 min. after addition | 0.005 | 0.38 | 0.89 | 0.17 |
| 25 min. after addition | 0.005 | 0.38 | 0.89 | 0.17 |
| 30 min. after addition | 0.005 | 0.40 | 0.89 | 0.15 |

Example No. VI

A 1000 pound charge of high-sulphur nickel pigs was melted and treated in the same manner as in the preceding example, except that the manganese was omitted. Sulphur elimination from this melt, which melted down with about 0.074% sulphur, was not as rapid as from the melt containing manganese. The sulphur content was reduced to about 0.005% in about twenty minutes after the introduction of the calcium treating agent, as set forth in Schedule VI.

*Schedule VI*

| Time when sample taken | Per cent sulphur | Per cent carbon | Per cent silicon |
|---|---|---|---|
| Melt down | 0.074 | 0.32 | |
| 5 min. after addition | 0.012 | 0.27 | 0.16 |
| 10 min. after addition | 0.008 | 0.26 | 0.15 |
| 15 min. after addition | 0.007 | 0.27 | 0.11 |
| 20 min. after addition | 0.005 | 0.27 | 0.12 |

Example No. VII

A 3900 pound charge of scrap nickel contaminated with sulphur was melted down in an electric furnace and a slag comprising about 120 pounds of lime and 80 pounds of fluorspar was placed on the surface of the bath. The charge melted down with about 0.41% sulphur. About 0.5% of metallic magnesium was added to the melt which was held for about 30 minutes and the slag was then skimmed from the surface of the bath. A second slag, similar to the first, was placed on the surface of the bath and about 0.1% of calcium was added in the form of a calcium-silicon alloy. The melt was then tapped into a ladle and cast into pigs. The amounts of sulphur contained in the molten nickel at various intervals are set forth in Schedule VII.

*Schedule VII*

| Time when sample taken | Per cent sulphur |
|---|---|
| Melt down | 0.41 |
| 30 min. after Mg addition | 0.046 |
| After Ca addition and casting | 0.005 |

The foregoing melt was produced for the purpose of producing castings. If the melt were to be used in the production of wrought products, the bath would be oxidized, or otherwise treated, after the calcium treatment to remove the excess calcium and silicon. The amounts of magnesium and calcium employed were larger than necessary in order to assure sulphur removal and to provide a margin of safety. The use of magnesium in conjunction with calcium appears to be particularly advantageous in the treatment of melts high in sulphur, as for example in excess of about 0.15% sulphur. The magnesium may be used to reduce the sulphur content to about 0.05%, under a first slag, while the calcium may be used to reduce the sulphur content from about 0.05% down to about 0.005% or less under a second slag.

The present invention is particularly applicable to the treatment of nickel and nickel-base alloys which in the molten condition contain sulphur and/or selenium and/or tellurium, for example, in treating nickel-copper alloys containing about 10% to about 45% or 50% copper and about 50% to about 90% nickel with or without incidental elements such as about 0.1% to about 10% of manganese, aluminum, titanium, silicon, iron, etc.; nickel-chromium alloys containing about 0.5% to about 35% chromium and about 50% to about 95% nickel with or without incidental elements such as about 0.1 to about 40% of iron and/or about 0.1% to 10% of manganese, aluminum, silicon, titanium, etc.; nickel-manganese alloys containing about 1% to about 20% manganese and about 80% to about 99% of nickel with or without incidental elements; etc. The method is also effective in removing sulphur, selenium and/or tellurium from other nickel-containing alloys, e. g., copper-nickel alloys containing about 3% to about 45%, or 50% nickel and about 50% to about 97% copper with or without incidental elements such as manganese, silicon, aluminum, zinc, tin, iron, etc.

The process provided by the present invention may be advantageously employed in conjunction with other processes for the more rapid removal of sulphur from nickel-containing masses, for example, in combination with the Lellep process which is described in United States Patents No. 1,278,176, No. 1,599,424, No. 1,623,797, No. 1,680,155 and No. 1,828,752, with the Edwards roasting process, with the fused caustic soda process, or with any other method capable of efficiently and economically reducing the sulphur content of nickel and nickel alloy ores, mattes, sulphides, oxides, etc., down to less than 3% or 2%, preferably below about 1% or 0.5%, for example, down to a few tenths of 1%. The invention may be used not only in conjunction with the treatment of sulphide ores of nickel and nickel alloys, such as are found in the Sudbury District of Canada but may also be used in the treatment of other nickel ores which may contain sulphur or which are converted in processing to sulphide or matte, for example, the nickel silicate ores of New Caledonia. The metal nickel generally occurs in nature as a sulphide combined with the sulphides of iron, copper and other impurities. The other impurities are removed by suitable processing, for example, by a combination of flotation, melting, converting, Bessemerizing, and dissolving in molten sodium sulphide. The sulphur is then usually removed by grinding the matte and oxidizing the sulphur from the matte in the solid state in an Edwards or Dwight Lloyd furnace. However, the roasting of sulphide to oxidize it in the solid state is a slow and costly process. Attempts have been made, for example, by the Lellep process, to remove the sulphur from mattes of nickel and nickel-copper alloys such as are sold under the trade-mark of "Monel" by blowing air through the molten material in a converter similar to the converters used in removing the sulphur from molten copper matte. Those attempts have been unsuccessful due to the difficulty in removing the last fraction of a per cent of sulphur. The equilibrium of the reaction involved, wherein nickel sulphide reacts with nickel oxide, is such that a very heavy excess of nickel oxide must be built up to remove the last few tenths of a per cent of sulphur. Very high temperatures are required to maintain the bath in the molten condition when it contains sufficient nickel oxide to remove the last portions of sulphur. Previous attempts to refine the aforesaid nickel and nickel-copper mattes by blowing in a converter have failed principally because the existing refractories could not withstand the adverse combination of the high temperatures required and the corrosive action of the high nickel oxide content of the bath. The prior carbide slag method referred to hereinbefore, and other slagging methods, for removing sulphur were too slow and ineffective to remove more than a few hundredths of a per cent of sulphur, say up to about 0.025% or 0.030%. Therefore, a gap existed between the lowest sulphur content which it was feasible to produce in a converter and the highest sulphur content which could be removed by refining in an electric furnace using the conventional slags. The present invention involving the use of calcium and/or magnesium in conjunction with suitable slags bridges that gap and provides a method of rapidly reducing the sulphur content down to the desired low amounts.

Using the process provided by the present invention, sulphur may be reduced by "blowing" in a converter down to about 1% sulphur or lower and then removing the remaining sulphur from the molten material quickly and economically by means of treatment with calcium and/or magnesium and a fluoride slag as described herein. The following example illustrates a procedure which may be employed in conjunction with a converter process, e. g., the Lellep process.

EXAMPLE No. VIII

Nickel-copper matte, in which the ratio of nickel to copper is approximately two to one, or nickel "second bottoms" from the Orford process which contain principally nickel and sulphur apparently as nickel sulphide, are melted in an open hearth furnace. The temperature is raised to about 2400° F. and the material is transferred to a converter, e. g., a converter of about 20 to 30 tons capacity. Although a Bessemer type converter is preferred in the Lellep process, a Peirce-Smith type converter may also be suitable. The air is then blown into the tuyères and the converter is rotated so that the air passes through the molten matte thereby oxidizing the sulphur from the bath. To reduce the chilling effect, the air should be preheated to the highest practical temperature, possibly about 1000° F. to 1200° F. The converter should also be supplied with auxiliary means for supplying heat to keep the bath molten, for example, gas or oil burners may be provided for this purpose. As the sulphur is removed from the bath by oxidation, it is desirable to raise the temperature of the bath to keep it in a molten condition. If auxiliary burners are provided, they should preferably be arranged so that the flame impinges upon the surface of the bath. The atmosphere of the burners is preferably maintained strongly oxidizing during the first part of the reaction. After the sulphur content of the bath is reduced to about 4% to 6% and the temperature raised to about 2600° F. to 2800° F., the flame from the auxiliary burners may be adjusted so that the atmosphere is nearly neutral. In this manner sulphur may be further reduced, apparently largely by diffusion due to decreasing the concentration in the molten metallic bath of the sulphur-containing product formed in the reaction, probably, sulphur dioxide. After the sulphur has dropped to a low level, for example, less than about 2% or 3% and preferably about 1% or less, the flame preferably is made reducing so as to reduce the excess oxide from the bath and the metal is transferred to a basic lined electric furnace or basic open hearth furnace where the carbon is raised to about 0.25% and about 0.25% to about 1.25% manganese is added. A white slag consisting of about 60% lime and 40% fluorspar weighing about 3% as much as the metallic charge is placed on the surface of the bath. An amount of magnesium about equal to the weight of the sulphur in the charge is added to the bath and stirred in thoroughly. About 15 to 30 minutes after the magnesium addition, the slag is removed from the surface of the bath and a sample analyzed to determine the sulphur content of the bath. At this point in the procedure, the sulphur content may be expected to be about 0.05% or less. If the charge comprises nickel to be subjected to further purification electrolytically, the bath should be oxidized, for example, by the addition of nickel oxide, to remove the excess of carbon and manganese, and then cast into anodes. If the bath is a nickel-copper alloy such as is sold under the trade-mark "Monel," and intended for wrought metal products, the sulphur would be further reduced to about 0.005%. After the sulphur has been reduced to about 0.05% by means of the magnesium addition, the first slag is removed and a second slag, the same as the first, is placed upon the surface of the bath. An amount of calcium equal to about 1.25 times the sulphur content of the bath is added and stirred thoroughly into the molten bath. The calcium may be added in the form of a master alloy containing approximately 33% calcium and the balance silicon since this alloy is cheaper than calcium metal. About 15 to 30 minutes after the calcium addition, the second slag is removed from the surface of the metal and excesses resulting from the calcium-silicon addition are removed, for example, by oxidizing the melt by the addition of nickel-copper oxide. A third or finishing slag of the same composition and quantity as the first and second slags is placed on the surface of the bath. The melt is then deoxidized in the usual manner and tapped and teemed into ingot molds for the production of wrought products.

The foregoing illustrative example may be varied at different stages. For example, a large part of the sulphur may be removed in the ladle while the material is being transferred from the converter to the basic-lined finishing furnace. According to this modified procedure, magnesium is added to the molten material in the ladle under a lower melting point slag, such as a fluoride slag of cryolite, and the ladle held for about 10 to 15 minutes. The ladle must be held for a sufficient length of time to permit the sulphides to rise to the surface and at the same time the metal must be prevented from freezing in the ladle. Means should be provided for keeping the metal hot while in the ladle so as to permit sulphur removal to be carried out therein. The slag is then removed from the ladle or the material is poured away from the slag in a bottom-pour ladle into the refining furnace where the final sulphur removal is effected. Treatment in the ladle may be advantageous as it provides a method of obtaining good separation of metal and slag, particularly in a bottom pour ladle, and it decreases contamination of the lining, etc., of the refining furnace with sulphur by decreasing the sulphur content of the material entering the furnace.

In another modification of the foregoing procedure, the process may be carried out in two basic refining furnaces, the major portion of the sulphur being removed in the first furnace and the material then transferred to a second furnace for finishing. When the metal is transferred from the first furnace to the second furnace by means of a ladle, e. g., a bottom pour ladle, good separation of the metal and slag may be obtained thereby reducing the danger of having sulphur reenter the metal due to incomplete removal of all the sulphur-containing slag.

As pointed out hereinbefore the calcium and/or magnesium treatment under a suitable slag may also be employed in conjunction with a roasting process. The following example is illustrative of the procedure which may be employed in conjunction with the Edwards roasting process.

EXAMPLE No. IX

Matte containing approximately 22% sulphur, the balance being principally nickel and copper in the ratio of about 2.5 parts of nickel to one of copper, is calcined in an Edwards roasting furnace equipped with mechanical rabble arms. This operation reduces the sulphur content of the average material to between about 0.025% and 0.05%, although the analysis of the product varies considerably, and some batches of material may contain as low as about 0.005% sulphur, or as much as 0.1% sulphur or higher. In exceptional cases, for example when a break down occurs in the equipment, sulphur contents as high as 0.45% have been encountered. The product of the calcination is a sulphur-containing nickel-copper oxide which is mixed with charcoal on the hearth of the furnace and withdrawn into drums holding about 5000 pounds each. Because of the charcoal mixed with the hot calcined oxide, a considerable part of the oxide is reduced to the metallic or sponge form, which makes it easier to melt. About 48,000 pounds of this partially reduced oxide is mixed with low-sulphur coal or tar coke and charged into a gas-fired open hearth furnace and melted. After melting, the charge is tapped into top-pouring ladles and transferred to electric arc melting furnaces. The bottoms or melting surfaces of these furnaces are lined with magnesite. The incidental slag formed during melting in the open hearth furnace is skimmed from the bath. If the carbon content of the charge is less than about 0.25% to 0.3%, tar coke is added in the electric furnace to raise the carbon to the desired value of about 0.25% to about 0.3%. About 1.35% of manganese is added to the charge and a white slag of about 320 pounds of lime and about 210 pounds of fluorspar is placed on the surface of the melt. The sulphur content is determined from a sample of the bath taken after melting in the open hearth. After the white fluoride slag has been thoroughly fused on the charge, an amount of calcium equal to about 1.25 times the weight of the sulphur to be removed is added to the bath.

The calcium may be in the form of metallic calcium but a calcium-silicon alloy is preferred for economic reasons, for example, a calcium-silicon alloy containing about 33% calcium has been found satisfactory. About 20 to 25 minutes after the calcium addition, the white slag is removed. At this stage of the operation, sulphur which was present in the melt has been transferred into the slag. If this white slag containing the sulphur could be 100% removed from the furnace, no further difficulty would be encountered due to sulphur re-entering the bath. However, the magnesite furnace lining absorbs some of the slag so it is substantially impossible to obtain 100% slag removal in commercial operation. The slagging of a commercial size furnace is an operation requiring an unusual combination of physical strength, skill and stamina to enable the worker to perform the required hard physical labor while subject to the extreme heat radiating from the door of the large furnace. Due to the existing conditions it is extremely difficult, if not impossible, in commercial practice to remove all the slag and, consequently, special precautions must be taken to prevent the sulphur from re-entering the bath at this stage, particularly when the charge being treated was melted down with about 0.05% or more of sulphur. In commercial operation care is taken to remove as much of the slag as possible. Preferably at least about 90% to 95% of the slag should be removed. In heats which originally melt down with up to 0.05% sulphur, e. g., about 0.03% to 0.05% sulphur, the excess calcium and any silicon which is introduced along with the calcium are oxidized and removed by means of additions of nickel-copper oxide after the removal of the first slag. When the calcium, and any silicon, have been completely removed, a second white slag, similar in weight and composition to the first slag, is placed on the surface of the bath. When this has thoroughly fused, the melt is deoxidized. A particularly satisfactory deoxidation is obtained with about 0.1% aluminum, about 0.025% zirconium, about 0.015% phosphorus, and about 0.05% magnesium. The melt is then tapped into a bottom-pour ladle and teemed into molds for the production of wrought products.

In heats which melt down with between about 0.05% and about 0.1% sulphur, a second "rinse" slag similar to the first slag is placed on the melt immediately after the first slag has been removed. When the "rinse" slag has thoroughly fused, it is splashed against the sides of the furnace to rinse off the last traces of the first slag and then the second slag is removed from the furnace. After this operation, the calcium and any silicon are oxidized and the melt is finished in the same way as the heats which melt down with up to about 0.05% sulphur, e. g., about 0.03% to 0.05% sulphur.

Heats which melt down with more than about 0.1% sulphur preferably are treated with another calcium addition and another slag to assure reduction of the sulphur content to a level of about 0.05%, from which level they are handled in the same manner as if they had been melted down with this sulphur content.

It will be appreciated that the preferred special precautions described in the foregoing example for preventing the re-entry of sulphur into the bath and for assuring the removal of substantially all the sulphur from heats containing various amounts of sulphur are applicable not only to the combined roasting process described in said example but are equally applicable to any melt treated in accordance with the present invention with calcium and/or magnesium under a suitable slag.

It will be observed that the method provided by the present invention for removing sulphur from molten metallic material may be combined with any other method for the preliminary removal of the bulk of the sulphur. The following example illustrates a procedure which may be employed in treating nickel matte or the like in conjunction with the recently developed fused caustic soda process invented by Bieber and Kalil.

EXAMPLE NO. X

The nickel sulphide is ground and then treated with fused sodium hydroxide, i. e., caustic soda. In this treatment the nickel sulphide is solid whereas the sodium hydroxide is molten. The sulphide is treated with the caustic soda at a temperature above about 800° F. but below the melting point of the nickel-containing material being treated and below the temperature at which corrosion and/or erosion of the container is sufficiently great as to make the process impracticable economically on an industrial scale, preferably between about 800° and 1200° F., and particularly at about 1000° to 1100° F. In carrying out the fused caustic treatment, it is important that a sufficiently large amount of sodium hydroxide be used for treating a given amount of the sulphide. The ratio of the sodium hydroxide to the sulphur present in a form combined with nickel, e. g., nickel sulphide, should be at least about 4.5 to 1, for example about 9 to 1. Thus, in treating a nickel matte containing about 22.5% sulphur, the ratio of sodium hydroxide to matte should be at least about one to one, for example about two to one. A higher ratio of sodium hydroxide to the matte, e. g., about 5 to 1 or 10 to 1 or even more, may be used but usually no substantial advantage is obtained in using too high a ratio and for economic reasons it is preferred to use a ratio of about 2:1 to about 5:1. This corresponds to a ratio of sodium hydroxide to sulphur of about 9:1 to about 23:1. However, when the material to be treated contains smaller amounts of sulphur, e. g., 1% to 5% sulphur, higher ratios of sodium hydroxide to sulphur are desirable in order to insure the maintenance of a two-phase system in which the material being treated is the solid phase and molten sodium hydroxide is present in sufficient amount as the liquid phase to prevent the entire mass from becoming pasty or too viscous. Likewise, when another metal, for example copper, is also present the sulphur combined with the copper should be taken into consideration along with that combined with the nickel. A treating time of about 4 to 8 hours has given satisfactory results in treating nickel matte containing about 22.5% sulphur with fused caustic soda at about 1000° F. Of course, longer times may be used and time of treatment is affected by the temperature used. When the mass to be treated contains less sulphur, e. g., about 1% to 5%, shorter times at temperature may be used, e. g., about 1 to 4 hours at about 1000° F. to 1200° F.

The solid metallic nickel powder or particles obtained by the fused caustic soda treatment are then treated to separate the metal particles from the alkali and alkali products, for example by leaching in hot water. The metal particles are melted in an open hearth type furnace and transferred to an electric furnace where the last fractions of sulphur are removed in the same manner as described heretofore by treating with calcium and/or magnesium under a suitable slag. It will be understood that when the term "nickel sulphide" is used in the foregoing description it is intended to include any nickel-containing material in which at least a part of the sulphur is combined with the nickel and includes not only the chemical compound but also combinations of nickel and sulphur in which the ratio of nickel to sulphur does not actually correspond to that of a pure chemical compound, for example, the second bottoms obtained from the Orford process (which are frequently referred to as nickel sulphide), mattes, calcined products thereof, etc. Thus, commercial nickel mattes which contain about 22% to 23% sulphur are usually a mixture of nickel sulphide and metallic nickel crystals. Similarly, a partially calcined matte which may contain up to about 4% to 5% of sulphur is a mixture of nickel oxide and nickel sulphide. The process may be applied not only to materials in which substantially all the sulphur is combined with nickel but also may be employed in treating materials, such as mattes, ores, sulphides, sulphur-containing oxides, etc., which also contain another metal, e. g., copper. Thus, a nickel-copper matte in which the proportion of nickel to copper is about 2 to 1 or 2.5 to 1, as in the nickel-copper alloy sold under the trade-mark of "Monel," may also be treated by the fused caustic process to preliminarily remove sulphur. Furthermore, instead of fused sodium hydroxide, another fused alkali metal hydroxide such as fused potassium hydroxide or fused lithium hydroxide may be used but fused sodium hydroxide is preferred. Likewise a combination of fused alkali metal hydroxides may be used.

There has been considerable conjecture on the mechanism of sulphur removal by slags, but even the most eminent authorities do not agree on this subject. However, it should be noted that the process provided by the present invention for the rapid removal of sulphur does not depend upon a reaction at the interface of the metal and slag such as was the case in the prior practice of removing sulphur from molten nickel and nickel alloys with a "carbide" slag. This interface type of reaction is very slow and inefficient. The present process involves the use of a soluble treating agent which rapidly liberates the sulphur from the metal in the body of the molten mass in combination with a white fluoride slag capable of readily taking up the sulphur or sulphide expelled from the molten bath. It is to be noted that the present invention effects a rapid removal of the sulphur and should not be confused with the practice of "fixing" sulphur, or "neutralizing" the harmful effects of sulphur, or of "desulphurizing" which is a term used interchangeably with the term "fixing" or "neutralizing." This latter practice aims to retain the sulphur in a less harmful form in the solidified metal and does not remove the sulphur. Such "fixing" or "neutralizing" practice involves pouring the molten metal as soon as the "fixer," "neutralizer" or "desulphurizer" is added to avoid its loss by oxidation or volatilization. In the present invention it is necessary to hold the molten metal under a slag in the furnace, ladle, or the like, for a sufficient length of time after the addition of the special metallic treating agent to allow the expelled sulphur or sulphide to be taken up by the slag. Little or no sulphur is removed from the molten bath if it is poured or tapped immediately after the addition of the treating agent.

It will be appreciated that the present invention provides a method for the rapid and efficient removal of sulphur from nickel-containing masses, particularly metallic nickel-containing masses, in which the molten nickel-containing mass while covered by a fluoride-containing slag is treated by incorporating a solid metallic agent containing calcium and/or magnesium in said molten or liquid mass. This method is not to be confused with processes involving the use of slag alone or the use of treating agents alone or processes in which molten or solid nickel-containing masses are treated with an oxidizing gas, e. g., air, or a process in which solid nickel-containing masses are treated with a molten agent, e. g., caustic soda.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims. For instance, the invention may be used in removing sulphur from metals, alloys and other materials containing at least on metallic constituent, for example, copper and copper-containing masses. Likewise, although the invention has been described with particular reference to the removal of sulphur, it is also applicable in removing selenium and/or tellurium from nickel-containing masses and other masses containing at least one metallic constituent.

We claim:

1. A method of removing sulphur from a high sulphur nickel-containing mass which comprises treating said mass to remove the bulk of the sulphur and to reduce the sulphur content to less than about 1%, covering a molten bath of said mass containing less than about 1% sulphur and more than about 0.25% manganese with a slag of lime and fluorspar, incorporating in said bath an amount of a magnesium-containing soluble metallic agent sufficient to reduce the sulphur content of said bath under said slag to less than about 0.2%, holding said bath under said slag to allow sulphur to be taken up by said slag and to lower the sulphur content of said bath below about 0.2%, removing said slag from said bath, covering said bath with a second slag of lime and fluorspar, incorporating in said bath an amount of a calcium-containing soluble metallic agent such that the calcium added is equal to at least about one and one quarter times the sulphur to be removed from the bath, holding said bath containing the calcium agent under said second slag to allow sulphur to be taken up by said slag, removing said second slag from the surface of the bath, and removing any excesses of said calcium-containing agent.

2. A method of removing sulphur from a high sulphur nickel-containing mass which comprises treating said mass to remove the bulk of the sulphur and to reduce the sulphur content to less than about 1%, covering a molten bath of said mass containing less than about 1% sulphur with a slag of lime and fluorspar, incorporating in said bath an amount of a magnesium-containing soluble metallic agent sufficient to reduce the sulphur content of said bath under said slag to less than about 0.2%, holding said bath under said slag to allow sulphur to be taken up by said slag and to lower the sulphur content of said bath below about 0.2%, removing said slag from said bath, covering said bath with a second slag of lime and fluorspar, incorporating in said bath an amount of a calcium-containing soluble metallic agent such that the calcium added is equal to at least about four-fifths of the sulphur to be removed from the bath, holding said bath containing the calcium agent under said second slag to allow sulphur to be taken up by said slag, removing said second slag from the surface of the bath, and removing any excesses of said calcium-containing agent.

3. A method of removing sulphur from a high sulphur nickel-containing mass having a sulphur content of over 3% which comprises treating said mass to reduce the sulphur content thereof to less than about 3%, covering a molten bath of said mass containing sulphur in an amount less than about 3% with a fluoride slag substantially free of silica, incorporating in said bath soluble metallic material containing at least one element from the group consisting of calcium and magnesium in an amount at least equal to about four-fifths of the sulphur to be removed by the treatment, holding said molten bath containing said material under said slag for at least five minutes but not exceeding one hour to allow sulphur to be taken up by said slag, and thereafter thoroughly removing the sulphur containing slag from the surface of the molten bath.

4. A method of removing sulphur from a high sulphur nickel-containing mass which comprises establishing a molten bath of said mass containing sulphur in excess of about 0.2% and manganese in excess of about 0.25% and covered with a slag of lime and fluorspar, incorporating in said bath an amount of magnesium at least about equal to the amount of sulphur to be removed, holding said bath under said slag until the sulphur content of the bath does not exceed about 0.05%, removing said slag, covering said bath with a second slag of lime and fluorspar, incorporating in said bath an amount of a calcium-containing soluble metallic agent such that the calcium added is equal to at least about one and one-quarter times the sulphur content of the bath, holding said bath containing calcium under said second slag to allow sulphur to be taken up by said slag, removing said second slag from the surface of said bath, subjecting said bath to oxidation treatment to remove any excesses of said calcium-containing agent, subjecting the molten mass to deoxidation treatment, and casting the molten mass.

5. A method of removing sulphur from a high sulphur nickel-containing mass which comprises establishing a molten bath of said mass containing sulphur in excess of about 0.2% and manganese in excess of about 0.25%, covering said bath with a slag of lime and fluorspar, incorporating in said bath an amount of a magnesium-containing soluble metallic agent at least about equal to the amount of sulphur to be removed, holding said bath under said slag for sufficient time for the slag to take up sulphur and to lower the sulphur content of the bath below 0.2%, removing said slag from said bath, covering said bath with a second slag of lime and fluorspar, incorporating in said bath an amount of a calcium-containing soluble metallic agent such that the calcium added is equal to at least about one and one-quarter times the sulphur content of the bath, holding said bath containing the calcium agent under said second slag for sufficient time for the slag to take up sulphur, removing said second slag from the surface of the bath, and eliminating any excesses of said calcium.

6. A method of removing sulphur from a high sulphur nickel-containing mass which comprises establishing a molten bath of said mass containing sulphur in excess of about 0.2%, covering said bath with a slag of lime and fluorspar, incorporating in said bath an amount of a magnesium-containing soluble metallic agent at least about equal to the amount of sulphur to be removed, holding said bath under said slag for sufficient time for the slag to take up sulphur and to lower the sulphur content of the bath below 0.2%, removing said slag from said bath, covering said bath with a second slag of lime and fluorspar, incorporating in said bath an amount of a calcium-containing soluble metallic agent such that the calcium added is equal to at least about one and one-quarter times the sulphur content of the bath, holding said bath containing the calcium agent under said second slag for sufficient time for the slag to take up sulphur, removing said second slag from the surface of the bath, and eliminating any excesses of said calcium.

7. A method of removing sulphur from a high sulphur nickel-containing metallic mass which comprises establishing a molten bath of said mass in which the sulphur content exceeds about 0.05% and the manganese exceeds about 0.25%, covering said bath with a fluoride slag, incorporating in said bath an amount of a magnesium-containing soluble metallic agent at least about equal to the amount of sulphur to be removed, holding said bath containing said magnesium agent under said slag to allow the slag to take up sulphur, removing said slag from the surface of the bath, covering said bath with a second fluoride slag, incorporating in said bath an amount of a calcium-containing soluble metallic agent such that the calcium added is equal to at least about one and one-quarter times the sulphur content of the bath, holding said bath containing the calcium agent under said slag to effect sulphur removal, removing said slag from the surface of the bath, and eliminating any excesses of said calcium-containing agent.

8. A method of removing sulphur from a high sulphur nickel-containing metallic mass which comprises establishing a molten bath of said mass in which the sulphur content exceeds about 0.05%, covering said bath with a fluoride slag, incorporating in said bath an amount of a magnesium-containing soluble metallic agent at least about equal to the amount of sulphur to be removed, holding said bath containing said magnesium agent under said slag to allow the slag to take up sulphur, removing said slag from the surface of the bath, covering said bath with a second fluoride slag, incorporating in said bath an amount of a calcium-containing soluble metallic agent such that the calcium added is equal to at least about one and one-quarter times the sulphur content of the bath, holding said bath containing the calcium agent under said slag to effect sulphur removal, removing said slag from the surface of the bath, and eliminating any excesses of said calcium-containing agent.

9. A method of reducing the sulphur content of a nickel-containing mass which comprises establishing a molten bath thereof containing sulphur and manganese, treating said molten bath under a lime-fluoride slag with a magnesium-containing soluble metallic agent and holding said bath under said slag for a period of time sufficient for sulphur to be taken up by said slag, thereafter removing said slag and treating said bath with a calcium-containing soluble metallic agent under a second fluoride slag, holding said bath under said slag for a period of time sufficient for sulphur to be taken up by said slag, thereafter removing said slag, and treating said bath to produce a deoxidized molten mass free from excessive amounts of said calcium-containing agent.

10. A method of reducing the sulphur content of a nickel-containing mass which comprises treating a molten bath thereof under a fluoride slag with a magnesium-containing soluble metallic agent and holding said bath under said slag for a period of time sufficient for sulphur to be taken up by said slag, thereafter removing said slag and treating said bath with a calcium-containing soluble metallic agent under a second fluoride slag, holding said bath under said second slag for a period of time sufficient for sulphur to be taken up by said slag, thereafter removing said slag and treating said bath to produce a deoxidized molten mass free from excessive amounts of said calcium-containing agent.

11. A method of removing sulphur from nickel and nickel-base alloys which comprises covering the surface of a molten bath thereof with a substantially silica-free slag containing about 40% to 60% lime and about 40% to 60% fluorspar, incorporating in said bath a soluble metallic agent containing at least one element from the group consisting of calcium and magnesium, the amount from said group added to the bath being such that at least about five parts thereof are added for each four parts of sulphur to be removed, holding said molten bath containing said agent under said slag for about 10 minutes to about 45 minutes whereby said slag takes up sulphur, thereafter removing substantially all of the sulphur-containing slag from the surface of the molten bath, subjecting said bath to treatment to remove excess amounts of said metallic agent, removing any oxygen in said bath, and casting the molten mass.

12. A method of removing sulphur from nickel and nickel-base alloys which comprises establishing a sulphur-containing molten bath thereof, covering said bath with a substantially silica-free slag containing a small amount up to about 75% lime and the balance essentially fluorspar, incorporating in said bath a soluble metallic agent containing at least one element of the group consisting of calcium and magnesium, the amount of said group incorporated in the bath being at least equal to the amount of sulphur to be removed, holding said molten bath containing said agent under said slag for a period of time exceeding about five minutes and up to about one hour to allow the slag to take up sulphur from said molten bath, thereafter thoroughly removing said sulphur-containing slag from the surface of the molten bath, subjecting said bath to oxidation treatment to remove excessive amounts of said metallic agent, deoxidizing said bath, and casting the molten mass.

13. A method of removing sulphur from nickel and nickel alloys which comprises establishing a molten bath thereof containing sulphur and at least about 0.25% manganese, covering said bath with a white slag of lime and fluorspar substantially free of silica, incorporating in said bath a soluble metallic agent containing at least one element from the group consisting of calcium and magnesium, said agent being added in an amount such that at least about four parts from the group consisting of calcium and magnesium are added for every five parts of sulphur to be removed, holding said molten bath containing said agent under said slag for more than five minutes but not more than one hour whereby the slag takes up sulphur, thereafter thoroughly removing the sulphur-containing slag from the surface of the molten bath thereby preventing resulphurization, eliminating any excess amounts of said metallic agent, and thereafter casting the molten mass.

14. A method of removing sulphur from nickel and nickel alloys which comprises covering a sulphur-containing molten bath thereof with a white slag of lime and fluorspar substantially free of silica, incorporating in said bath a soluble metallic agent containing at least one element from the group consisting of calcium and magnesium, said agent being added in an amount such that at least about four parts from the group consisting of calcium and magnesium are added for every five parts of sulphur to be removed, holding said molten bath containing said agent under said slag for more than five minutes but not more than one hour whereby the slag takes up sulphur, thereafter thoroughly removing the sulphur-containing slag from the surface of the molten bath, eliminating any excess amounts of said metallic agent, and thereafter casting the molten mass.

15. A method of removing sulphur from nickel-rich metallic material in which at least 50% of the metallic elements is nickel which comprises covering the surface of a molten bath of said nickel-rich metallic material containing at least about 0.03% sulphur and at least about 0.25% manganese with a white slag of lime and fluorspar substantially free of silica, incorporating in said bath an amount of a soluble metallic agent containing at least one element from the group consisting of calcium and magnesium such that at least four parts of said group are added for every five parts of sulphur to be removed by the treatment and such that sulphur is caused to be rapidly taken up by the slag, holding said molten bath containing said agent under said slag for more than five minutes but less than one hour to permit said slag to take up sulphur, thereafter removing said sulphur containing slag from the surface of the molten bath and replacing said slag by a second similar slag to rinse out any remaining amounts of the sulphur-containing slag, removing said second slag, subjecting said bath to treatment to remove excess amounts of said agent and to produce a deoxidized molten mass, and casting the molten mass.

16. A method of removing sulphur from nickel-rich metallic material in which at least 50% of the metallic elements is nickel which comprises covering the surface of a sulphur-containing molten bath of nickel-rich material with a white slag of lime and fluorspar substantially free of silica, incorporating in said bath a soluble metallic agent containing at least one element from the group consisting of calcium and magnesium, the amount added from said group being at least equal to the amount of sulphur to be removed, holding said molten bath containing said agent under said slag for ten to forty-five minutes to permit said slag to take up sulphur rapidly, thereafter removing said slag from the surface of the molten bath and replacing said slag by a second similar slag to rinse out any remaining amounts of the sulphur-containing slag, removing said second slag, subjecting said bath to treatment to remove excess amounts of said agent and to produce a deoxidized molten mass, and casting the molten mass.

17. A method of removing sulphur from a nickel-containing mass in which at least 50% of the metallic elements is nickel which comprises covering a molten bath of said mass containing at least about 0.03% sulphur and at least about 0.25% manganese with a substantially silica-free slag of calcium oxide and calcium fluoride, incorporating in said bath a soluble metallic agent containing at least one element from the group consisting of calcium and magnesium, the amount added from said group being at least equal to the amount of sulphur to be removed, holding said molten bath containing said agent under said slag between ten and forty-five minutes for the slag to take up sulphur, thereafter thoroughly removing from the surface of the molten bath substantially all of said slag containing the sulphur taken up and eliminating any excess amounts of said treating agent.

18. A method of removing sulphur from a nickel-containing mass in which at least 50% of the metallic elements is nickel which comprises covering a molten bath of said mass containing sulphur with a substantially silica-free slag comprised essentially of calcium oxide and calcium fluoride, introducing in said bath a soluble metallic agent containing at least one element from the group consisting of calcium and magnesium, the amount added from said group being at least equal to the amount of sulphur to be removed, holding said molten bath containing said agent under said slag for at least five minutes but not exceeding one hour for the slag to take up sulphur, thereafter thoroughly removing substantially all of said sulphur-containing slag from the surface of the molten bath and eliminating any excess amounts of said treating agent.

19. A method of removing sulphur from a metallic nickel-containing mass in which at least 50% of the metallic elements is nickel which comprises establishing a molten bath of said mass containing sulphur and at least about 0.25% manganese covered by a fluoride slag substantially free of silica, incorporating in said bath a soluble metallic agent containing at least one element from the group consisting of calcium and magnesium, the amount added from said group being at least about equal to the amount of sulphur to be removed thereby, holding said molten bath containing said agent under said slag for 5 to 45 minutes for the slag to take up sulphur and thereafter thoroughly removing the slag from the surface of the molten bath to prevent subsequent resulphurization.

20. A method of reducing the sulphur content of a nickel-containing mass in which at least 50% of the metallic elements is nickel which comprises treating a molten bath thereof under a substantially silica-free fluoride slag with a soluble metallic agent containing at least one element from the group consisting of calcium and magnesium, at least four parts from said group being added for every five parts of sulphur to be removed, holding said bath under said slag at least five minutes but not exceeding one hour for sulphur to be taken up by said slag, thereafter thoroughly removing said slag containing the sulphur taken up to prevent subsequent resulphurization, and treating said bath to produce a deoxidized molten mass free from excessive amounts of said agent.

21. A method of removing sulphur from a nickel-containing mass in which at least 50% of the metallic elements is nickel which comprises covering a molten bath of said mass containing sulphur with a fluoride slag substantially free of silica, incorporating in said bath a soluble metallic agent containing at least one from the group consisting of calcium and magnesium, at least four parts from said group being added for every five parts of sulphur to be removed, holding said molten bath containing said agent under said slag for sufficient time for the slag to take up sulphur but not exceeding one hour thereby preventing substantial resulphurization, thereafter removing the slag from the surface of the molten bath to prevent substantial subsequent resulphurization, and casting the molten mass.

22. A method of removing at least one element of the group consisting of sulphur, selenium and tellurium from a mass containing over 50% nickel which comprises covering a molten bath of said mass containing at least one of the elements of said group with a fluoride slag substantially free of silica, incorporating in said bath a soluble metallic agent containing at least one element from the group consisting of calcium and magnesium, at least four parts from said group consisting of calcium and magnesium being added for every five parts of sulphur to be removed, holding said molten bath containing said agent under said slag for more than five minutes but less than one hour for the slag to take up said element of the group consisting of sulphur, selenium and tellurium, and thereafter thoroughly removing the slag containing at least one element of the group consisting of sulphur, selenium and tellurium from the surface of the molten bath.

23. A method of removing sulphur from a metallic mass containing at least 50% nickel which comprises covering a molten bath of said metallic nickel-containing mass with a fluoride-containing slag substantially free of silica, incorporating in said molten bath covered by said slag a soluble agent containing at least one element from the group consisting of calcium and magnesium, the amount added from said group being at least about equal to the amount of sulphur to be removed, and within one hour after incorporating said agent thoroughly separating said slag from said molten metallic mass, whereby a metallic nickel-containing molten mass is obtained from which sulphur has been rapidly removed.

24. A method of removing sulphur from a metallic mass containing at least 50% nickel which comprises covering a molten bath of said metallic nickel-containing mass with a fluoride-containing slag substantially free of silica, incorporating in said molten bath covered by said slag a metallic agent containing at least one element from the group consisting of calcium and magnesium, at least four parts from said group being added for every five parts of sulphur to be removed by the operation, within one hour after incorporating said agent separating said slag from said molten metallic mass, and repeating the foregoing operations with a thorough separation of slag from molten metallic mass to prevent substantial subsequent resulphurization, whereby the sulphur content of the metallic nickel-containing molten mass is rapidly decreased to the desired small amounts of sulphur.

25. A method of reducing the content of at least one element of the group consisting of sulphur, selenium and tellurium in a nickel-containing mass which comprises treating a molten bath thereof under a fluoride slag with a magnesium-containing soluble metallic agent and holding said bath under said slag for a period of time sufficient for at least one element of said group to be taken up by said slag, thereafter removing said slag and treating said bath with a calcium-containing soluble metallic agent under a second fluoride slag, holding said bath under said second slag for a period of time sufficient for at least one element of said group to be taken up by said slag, thereafter removing said slag and treating said bath to produce a deoxidized molten mass free from excessive amounts of said calcium-containing agent.

26. In a process of producing metallic products of nickel and nickel alloys containing at least 50% nickel from sulphur-containing material, that improvement which comprises removing at least part of the sulphur by treating a molten mass of said material containing sulphur and at least 50% nickel under a lime-fluorspar slag with a soluble metallic agent containing at least one element from the group consisting of calcium and magnesium, the amount added from said group being at least equal to the amount of sulphur to be removed, holding said molten mass containing said agent under said slag for at least five minutes but not more than one hour for the slag to take up sulphur, thereafter thoroughly removing said sulphur-containing slag from the surface of said mass to prevent substantial subsequent resulphurization.

27. A method of reducing the sulphur content of a mass in which at least 50% of the metallic elements is from the group consisting of nickel and copper which comprises covering a molten bath of said mass containing sulphur with a slag containing up to about 75% calcium oxide and the balance substantially calcium fluoride, incorporating in said bath a soluble metallic agent containing metal selected from the group consisting of calcium and magnesium in an amount at least about equal to the amount of sulphur to be removed thereby, holding said molten bath containing said agent under said slag for more than five minutes but not exceeding one hour for the slag to take up sulphur, and thoroughly separating substantially all the sulphur-containing slag from the molten bath.

28. A method of reducing the content of at least one element selected from the group consisting of selenium and tellurium in a mass containing over 50% nickel which comprises covering a molten bath of said mass with a slag containing up to about 75% lime and the balance substantially fluorspar, incorporating in said bath a soluble metallic agent containing metal selected from the group consisting of calcium and magnesium, holding said molten bath containing said agent under said slag for more than five minutes but not exceeding one hour, and thoroughly separating substantially all said slag from the molten bath.

CLARENCE GEORGE BIEBER.
BENGT EDWARD ERNST FRANKE.
WALTER FRANKLIN SUMPTER.